(12) United States Patent
Futaki et al.

(10) Patent No.: US 12,200,748 B2
(45) Date of Patent: Jan. 14, 2025

(54) RADIO TERMINAL, RADIO ACCESS NETWORK NODE, AND METHOD THEREFOR

(71) Applicant: NEC Corporation, Tokyo (JP)

(72) Inventors: Hisashi Futaki, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 569 days.

(21) Appl. No.: 17/287,003

(22) PCT Filed: Aug. 20, 2019

(86) PCT No.: PCT/JP2019/032475
§ 371 (c)(1),
(2) Date: Apr. 20, 2021

(87) PCT Pub. No.: WO2020/084879
PCT Pub. Date: Apr. 30, 2020

(65) Prior Publication Data
US 2021/0392651 A1 Dec. 16, 2021

(30) Foreign Application Priority Data
Oct. 26, 2018 (JP) ................. 2018-202275

(51) Int. Cl.
*H04W 72/08* (2009.01)
*H04W 24/10* (2009.01)
(Continued)

(52) U.S. Cl.
CPC ......... *H04W 72/542* (2023.01); *H04W 24/10* (2013.01); *H04W 72/044* (2013.01); *H04W 72/23* (2023.01)

(58) Field of Classification Search
CPC . H04W 72/542; H04W 72/044; H04W 72/23; H04W 24/10; H04W 76/15; H04L 5/0098; H04L 5/001
(Continued)

(56) References Cited

U.S. PATENT DOCUMENTS 11,350,321 B2  5/2022 Yang et al.
2019/0103954 A1  4/2019 Lee et al.
(Continued)

FOREIGN PATENT DOCUMENTS

JP  2020-532149 A  11/2020
WO  2019/014892 A1  1/2019

OTHER PUBLICATIONS

Extended European Search Report for EP Application No. EP19876051.4 dated on Jan. 18, 2022.
(Continued)

*Primary Examiner* — Candal Elpenord
(74) *Attorney, Agent, or Firm* — Sughrue Mion, PLLC

(57) ABSTRACT

When a secondary cell of carrier aggregation has been activated, a radio terminal (2) communicates with a radio access network (RAN) node (1) in an active downlink (DL) bandwidth part (BWP) selected from among a plurality of DL BWPs for the secondary cell. In addition, when the secondary cell is in a dormant state, the radio terminal (2) transmits to the RAN node (1), via a primary cell or another activated serving cell of the carrier aggregation, a channel state information report for a target DL BWP selected from among the plurality of DL BWPs. It is thus, for example, possible to allow the radio terminal to perform channel a state information measurement on a dormant SCell that has been configured with a plurality of BWPs.

19 Claims, 5 Drawing Sheets

(51) Int. Cl.
  *H04W 72/04* (2023.01)
  *H04W 72/044* (2023.01)
  *H04W 72/23* (2023.01)
  *H04W 72/542* (2023.01)
(58) Field of Classification Search
  USPC .................................................. 370/329–330
  See application file for complete search history.

(56) References Cited

U.S. PATENT DOCUMENTS

| | | | |
|---|---|---|---|
| 2019/0124558 A1* | 4/2019 | Ang | H04W 36/0016 |
| 2020/0029316 A1 | 1/2020 | Zhou et al. | |
| 2020/0037248 A1 | 1/2020 | Zhou et al. | |
| 2020/0052769 A1* | 2/2020 | Cirik | H04L 1/0026 |
| 2020/0053799 A1* | 2/2020 | Jeon | H04W 16/14 |
| 2020/0100179 A1* | 3/2020 | Zhou | H04W 52/0216 |
| 2021/0051536 A1 | 2/2021 | Yang et al. | |
| 2022/0086683 A1* | 3/2022 | Jin | H04W 28/0268 |

OTHER PUBLICATIONS

MediaTek Inc., "RRM Measurement for Bandwidth Part Operation", 3GPP Draft, R2-1708001, Aug. 20, 2017, Germany.

3rd Generation Partnership Project; Technical Specification Group Radio Access Network; NR; Radio Resource Control (RRC) protocol specification (Release 15), 3GPP TS 38.331 V15.2.0, Jun. 20, 2018.

International Search Report for PCT Application No. PCT/JP2019/032475, mailed on Nov. 5, 2019.

Nokia, Nokia Shanghai Bell, "Stage-2 description of euCA", 3GPP R2-1809245, 3GPP TSG-RAN WG2 Meeting #102, Busan, South Korea, May 21-25, 2018.

Nokia, Nokia Shanghai Bell, "UE capability definitions for euCA", 3GPP R2-1809246, 3GPP TSG-RAN WG2 Meeting #102, Busan, South Korea, May 21-25, 2018.

Nokia, Nokia Shanghai Bell, "MAC functionality for euCA", 3GPP R2-1809269, 3GPP TSG-RAN WG2 Meeting #102, Busan, Republic of Korea, May 21-25, 2018.

Nokia, Nokia Shanghai Bell, "Signalling for euCA (Enhancing LTE CA Utilization)", 3GPP RP-182006, 3GPP TSG RAN Meeting #81, Gold Coast, Australia, Sep. 10-13, 2018.

Qualcomm Incorporated, "UE Adaptation to the Traffic and UE Power Consumption Characteristics", 3GPP R1-1811282, 3GPP TSG RAN WG1 Meeting #94bis, Chengdu, China, Oct. 8-12, 2018, pp. 1-17.

LG Electronics, "Discussion on power saving for CA operation", 3GPP R1-1810312, 3GPP TSG RAN WG1 Meeting #94bis, Chengdu, China, Oct. 8-12, 2018.

Qualcomm Incorporated, "Dormant BWP for fast SCell activation", 3GPP R2-1808570, 3GPP TSG RAN WG2 Meeting #102, Busan, Korea, May 21-25, 2018, pp. 1-2.

3rd Generation Partnership Project, "Technical Specification Group Radio Access Network; NR; Radio Resource Control (RRC) protocol specification (Release 15)", 3GPP TS 38.331 V15.3.0, Sep. 2018, pp. 1-445.

3rd Generation Partnership Project, "Technical Specification Group Radio Access Network: NR; Physical layer procedures for control (Release 15)", 3GPP TS 38.213 V15.3.0. Sep. 2018, pp. 1-101.

JP Office Action for JP Application No. 2022-145098, mailed on Jul. 11, 2023 with English Translation.

OPPO, Discussion on measurement configuration enhancement in Inactive state, 3GPP TSG RAN WG2 #99 R2- 1708367, Aug. 25, 2017, pp. 1-5, Berlin, Germany.

* cited by examiner

RADIO TERMINAL, RADIO ACCESS NETWORK NODE, AND METHOD THEREFOR

This application is a National Stage Entry of PCT/JP2019/032475 filed on Aug. 20, 2019, which claims priority from Japanese Patent Application 2018-202275 filed on Oct. 26, 2018, the contents of all of which are incorporated herein by reference, in their entirety.

TECHNICAL FIELD

The present disclosure relates to a radio communication system and, in particular, enhancements to carrier aggregation.

BACKGROUND ART

The 3rd Generation Partnership Project (3GPP) Release 15 will introduce enhancements to carrier aggregation (CA). These enhancements intend to fast (or quick) setup and activation of a Secondary Cell (SCell) (see Non-Patent Literature 1-4).

One of these enhancements is introduction of a new SCell state called "dormancy mode (dormant state)". When the SCell is in dormant state, a radio terminal (i.e., User Equipment (UE)) measures and reports Channel State Information (CSI), but it does not monitor Physical Downlink Control Channel (PDCCH). That is, dormant SCell state (or an SCell in dormant state) differs from activated SCell state (or an SCell in activated state) at least in that the UE does not monitor PDCCH. In addition, dormant SCell state differs from deactivated SCell state (or an SCell in deactivated state) at least in that the UE measures and reports CSI.

Another one of the enhancements is introduction of IDLE mode measurements. When a UE moves from Radio Resource Control (RRC)_CONNECTED to RRC_IDLE, the eNB assigns, to the UE, measurements of inter-frequency carriers in RRC_IDLE. Specifically, the eNB transmits a configuration of IDLE mode measurements to the UE, via an RRC Connection Release or system information (i.e., System Information Block Type 5 (SIB5)). The UE performs IDLE mode measurements on frequency carriers configured by the eNB. The IDLE mode measurements may be done within only certain cells configured by the eNB. These cell are called "validity area". The eNB may transmit to the UE a list of cells indicating the validity area.

Besides, as well kwon, the 3GPP has been working on the standardization for the fifth generation mobile communication system (5G) to make 5G a commercial reality in 2020 or later. In this specification, the fifth generation mobile communication system is referred to as 5G System or Next Generation (NextGen) System (NG System). The new Radio Access Technology (RAT) for the 5G System is referred to as New Radio, NR, 5G RAT, or NG RAT. A new Radio Access Network (RAN) for the 5G System is referred to as NextGen RAN, NG RAN, or a 5G-RAN. A new base station in the NG-RAN is referred to as gNodeB or gNB. A new core network for the 5G System is referred to as 5G Core Network (5GC) or NextGen Core (NG Core). A radio terminal (i.e., User Equipment (UE)) capable of being connected to the 5G System is referred to as 5G UE or NextGen UE (NG UE), or simply referred to as UE.

The main components of the 5GC includes an Access and Mobility Management function (AMF), a Session Management function (SMF), and a User plane function (UPF). The AMF performs, for example, connection and mobility managements for UEs and provides a termination of a control plane (CP) of the NG-RAN (e.g., exchange of CP information with NG-RAN nodes), and termination of a NAS layer (e.g., exchange of NAS messages with UEs). The SMF performs, for example, a session management (SM) and provides a termination of the session management part of NAS massages. The UPF is an anchor point of Intra-RAT and Inter-RAT mobility (e.g., handover) and performs, for example, a management of QoS flows (e.g., DL reflective QoS marking).

The term "LTE" used in this specification includes enhancement/evolution of LTE and LTE-Advanced to provide interworking with the 5G System, unless otherwise specified. The enhancement/evolution of LTE and LTE-Advanced for the interworking with the 5G System is referred to as LTE-Advanced Pro, LTE+, or enhanced LTE (eLTE). For example, an eLTE eNB functioning as a NG-RAN node is referred to as ng-eNB. Further, terms related to LTE networks and logical entities used in this specification, such as "Evolved Packet Core (EPC)", "Mobility Management Entity (MME)", "Serving Gateway (S-GW)", and "Packet Data Network (PDN) Gateway (P-GW))", include their enhancement/evolution to provide interworking with the 5G System, unless otherwise specified. Enhanced EPC, enhanced MME, enhanced S-GW, and enhanced P-GW are referred to, for example, as enhanced EPC (eEPC), enhanced MME (eMME), enhanced S-GW (eS-GW), and enhanced P-GW (eP-GW), respectively.

The NR supports use of different sets of radio parameters in multiple frequency bands. Each radio parameter set is referred to as "numerology". Orthogonal Frequency Division Multiplexing (OFDM) numerology for an OFDM system includes, for example, subcarrier spacing, system bandwidth, Transmission Time Interval (TTI) length, subframe duration, cyclic prefix length, and symbol duration. The 5G system supports various types of services having different service requirements, including, for example, enhanced Mobile Broad Band (eMBB), Ultra Reliable and Low Latency Communication (URLLC), and M2M communication with a large number of connections (e.g., massive Machine Type Communication (mMTC)). Numerology selection depends on service requirements.

The NR supports channel bandwidths wider than those of the LTE (e.g., 100s of MHz). One channel bandwidth (i.e., a BWChannel) is a radio frequency (RF) bandwidth supporting one NR carrier. The channel bandwidth is also referred to as a system bandwidth. While the LTE supports channel bandwidths up to 20 MHz, the 5G NR supports channel bandwidths, for example, up to 800 MHz.

In order to effectively support multiple 5G services, such as wideband services like eMBB and narrow-bandwidth services like Internet of Things (IoT), it is preferable to multiplex these services onto a single channel bandwidth. Further, if every 5G UE needs to support transmission and reception in a transmission bandwidth corresponding to the entire channel bandwidth, this may hinder achievement of lower cost and lower power consumption of UEs for narrow-bandwidth IoT services. Thus, the 3GPP allows one or more bandwidth parts (BWPs) to be configured in the carrier bandwidth (i.e., channel bandwidth or system bandwidth) of each NR component carrier. The bandwidth part is also referred to as carrier bandwidth part. Multiple BWPs may be used for different frequency division multiplexing (FDM) schemes using different numerologies (e.g., subcarrier spacing (SCS)). For example, multiple BWPs may have different SCSs and different bandwidths.

In one example, the channel bandwidth of one component carrier is divided into BWP #1 and BWP #2, and these two BWPs are used for FDM schemes using different numerologies (e.g., different subcarrier spacing). In another example, narrowband BWP #1 is set in a channel bandwidth of one component carrier and narrowband BWP #2 narrower than BWP #1 is further set within the BWP #1. When BWP #1 or BWP #2 is activated for the UE, this UE can reduce its power consumption by refraining from performing reception and transmission within the channel bandwidth except the active BWP.

One bandwidth part (BWP) is frequency-consecutive and consists of contiguous physical resource blocks (PRBs). The bandwidth of one BWP is at least as large as a synchronization signal (SS)/physical broadcast channel (PBCH) block. The BWP may or may not include an SS/PBCH block (SSB).

A BWP configuration includes, for example, numerology, a frequency location, and a bandwidth (e.g., the number of PRBs). In order to specify the frequency location, common PRB indexing is used at least for a downlink (DL) BWP configuration in a Radio Resource Control (RRC) connected state. Specifically, an offset from PRB 0 to the lowest PRB of the SS/PBCH block to be accessed by a UE is configured by higher layer signaling. The reference point "PRB 0" is common to all the UEs that share the same wideband component.

One or more BWP configurations for each component carrier are semi-statically signaled to the UE. To be specific, for each UE-specific serving cell, one or more DL BWPs (e.g., up to four DL BWPs) and one or more UL BWPs (e.g., up to four UL BWPs) can be configured for the UE via a dedicated RRC message. One or more DL BWPs and one or more UL BWPs configured for the UE are referred to as a DL BWP set and a UL BWP set, respectively.

Each of the one or more BWPs (i.e., BWP set) configured for the UE can be activated and deactivated. The activated BWP is referred to as active BWP. Specifically, the UE receives signals on one or more active DL BWPs in the configured DL BWP set at a given time. Likewise, the UE transmits signals on one or more active UL BWPs in the configured UL BWP set at a given time. In the current specification, only one DL BWP and only one UL BWP are activated at a given time.

Activation/deactivation of a BWP may be determined by a lower layer (e.g., a Physical (PHY) layer or a Medium Access Control (MAC) layer), rather than by the RRC layer. Switching of the Active BWP is performed by, for example, Downlink Control Information (DCI) (e.g., scheduling DCI) transmitted on an NR Physical Downlink Control Channel (PDCCH). In other words, deactivation of a current active BWP and activation of a new active BWP may be performed by the DCI in the NR PDCCH. The network can activate/deactivate a BWP depending, for example, on a data rate, or on numerology required by a service, and can thereby dynamically switch the active BWP for the UE.

A BWP where the UE initially stays when the UE accesses a serving cell (i.e., when the UE transitions from Idle mode to Connected mode) is referred to as an "initial BWP". The initial BWP includes at least a DL BWP and may include a UL BWP (when an uplink is configured for the serving cell). The BWP set configured for the UE always includes the initial BWP.

The initial BWP is always configured with a Common Search Space (i.e., Type0-PDCCH common search space). BWPs other than the initial BWP may or may not be configured with a Common Search Space. A Search Space is a subset of resources (i.e., PDCCH Search Space) in which the UE performs blind decoding to find PDCCH data (i.e., DCI). In the 5G system, like in the LTE, the PDCCH Search Space includes a Common Search Space and a UE-specific Search Space. The UE-specific search space is configured individually for each UE via RRC signaling.

CITATION LIST

Non Patent Literature

[Non Patent Literature 1] Nokia, Nokia Shanghai Bell, "Stage-2 description of euCA", 3GPP R2-1809245, 3GPP TSG-RAN WG2 Meeting #102, Busan, South Korea, 21-25 May 2018

[Non Patent Literature 2] Nokia, Nokia Shanghai Bell, "UE capability definitions for euCA", 3GPP R2-1809246, 3GPP TSG-RAN WG2 Meeting #102, Busan, South Korea, 21-25 May 2018

[Non Patent Literature 3] Nokia, Nokia Shanghai Bell, "MAC functionality for euCA", 3GPP R2-1809269, 3GPP TSG-RAN WG2 Meeting #102, Busan, South Korea, 21-25 May 2018

[Non Patent Literature 4] Nokia, Nokia Shanghai Bell, "Signalling for euCA (Enhancing LTE CA Utilization)", 3GPP RP-182006, 3GPP TSG RAN Meeting #81, Gold Coast, Australia, 10-13 Sep. 2018

SUMMARY OF INVENTION

Technical Problem

The inventors have studied the above-described enhancements to carrier aggregation and found various problems. For example, there are problems to introduce CSI reporting for SCell in dormant state to the Radio Access Technology (RAT) of the fifth generation mobile communication system. In the 5G NR, at most four DL BWPs can be configured over one SCell. When an SCell configured with a plurality of BWPs is in dormant state, it is not clear how the UE performs a CSI measurement on the SCell in dormant state.

One of the objects to be attained by embodiments disclosed herein is to provide apparatuses, methods, and programs that allow a radio terminal to perform a channel state information measurement on a dormant SCell that has been configured with a plurality of BWPs. It should be noted that this object is merely one of the objects to be attained by the embodiments disclosed herein. Other objects or problems and novel features will be made apparent from the following description and the accompanying drawings.

Solution to Problem

In a first aspect, a radio terminal includes at least one memory and at least one processor coupled to the at least one memory. The at least one processor is configured to, when a secondary cell of carrier aggregation has been activated, communicate with a radio access network (RAN) node in an active downlink bandwidth part (DL BWP) selected from among a plurality of DL BWPs for the secondary cell. The at least one processor is further configured to, when the secondary cell is in a dormant state, transmit to the RAN node, via a primary cell or another activated serving cell of the carrier aggregation, a channel state information report for a target DL BWP selected from among the plurality of DL BWPs.

In a second aspect, a radio access network node includes at least one memory and at least one processor coupled to the at least one memory. The at least one processor is configured to, when a secondary cell of carrier aggregation has been activated, communicate with a radio terminal in an active downlink bandwidth part (DL BWP) selected from among a plurality of DL BWPs for the secondary cell. The at least one processor is further configured to, when the secondary cell is in a dormant state, receive from the radio terminal, via a primary cell or another activated serving cell of the carrier aggregation, a channel state information report for a target DL BWP selected from among the plurality of DL BWPs.

In a third aspect, a method performed by a radio terminal includes: (a) when a secondary cell of carrier aggregation has been activated, communicating with a radio access network (RAN) node in an active downlink bandwidth part (DL BWP) selected from among a plurality of DL BWPs for the secondary cell; and (b) when the secondary cell is in a dormant state, transmitting to the RAN node, via a primary cell or another activated serving cell of the carrier aggregation, a channel state information report for a target DL BWP selected from among the plurality of DL BWPs.

In a fourth aspect, a method performed by a radio access network node includes: (a) when a secondary cell of carrier aggregation has been activated, communicating with a radio terminal in an active downlink bandwidth part (DL BWP) selected from among a plurality of DL BWPs for the secondary cell; and (b) when the secondary cell is in a dormant state, receiving from the radio terminal, via a primary cell or another activated serving cell of the carrier aggregation, a channel state information report for a target DL BWP selected from among the plurality of DL BWPs.

In a fifth aspect, a program includes instructions (software codes) that, when loaded into a computer, cause the computer to perform the method according to the above-described third or fourth aspect.

Advantageous Effects of Invention

According to the above-described aspects, it is possible to provide apparatuses, methods, and programs that allow a radio terminal to perform a channel state information measurement on a dormant SCell that has been configured with a plurality of BWPs.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and also contribute to obtaining advantages different from one another.

The following descriptions on the embodiments mainly focus on the 3GPP 5G systems. However, these embodiments may be applied to other radio communication systems.

First Embodiment

Figure 1:
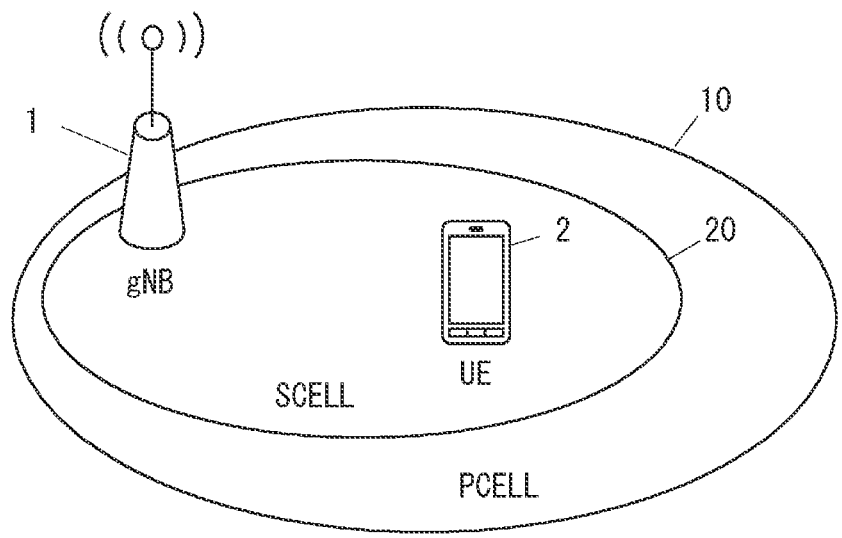
FIG. 1 is a diagram showing a configuration example of a radio communication network according to embodiments.

FIG. 1 shows a configuration example of a radio communication network according to embodiments including this embodiment. In the example shown in FIG. 1, the radio communication network includes a base station (i.e., gNB) 1 and a radio terminal (i.e., UE) 2. The gNB 1 may include a gNB Central Unit (gNB-CU) and one or more gNB Distributed Units (gNB-DUs) in the cloud RAN (C-RAN) deployment. The gNB provides a primary cell (PCell) 10 and secondary cell (SCell) 20 to the UE 2. The UE 2 communicates with the gNB 1, using carrier aggregation between the primary cell (PCell) 10 and the secondary cell (SCell) 20.

The UE 2 may be simultaneously connected to a plurality of base stations (i.e., Master gNB (MgNB) and Secondary gNB (SgNB)) for dual connectivity. In this case, the gNB 1 may serve as the MgNB or the SgNB. The PCell 10 and the SCell 20 shown in FIG. 1 may be a PCell and an SCell included in a Master Cell Group (MCG) or may be a Primary SCG Cell (PSCell) and an SCell included in a Secondary Cell Group (SCG). The PCell of the MCG and the PSCell of the SCG for dual connectivity are each referred to as a Special Cell (SpCell).

When the SCell 20 has been activated, the UE 2 communicates with the gNB 1 on an active DL BWP selected from one or more DL BWPs for the SCell 20. As already described, the UE 2 is configured with one or more DL BWPs (e.g., up to four DL BWPs) for each of the serving cells, such as the PCell 10 and the SCell 20. The one or more DL BWPs configured in the UE 2 are called a DL BWP set. The UE receives signals on one or more active DL BWPs of the configured DL BWP set at a given time. Similarly, the UE transmits signals on one or more active UL BWPs of the configured UL BWP set at a given time.

Figure 2:
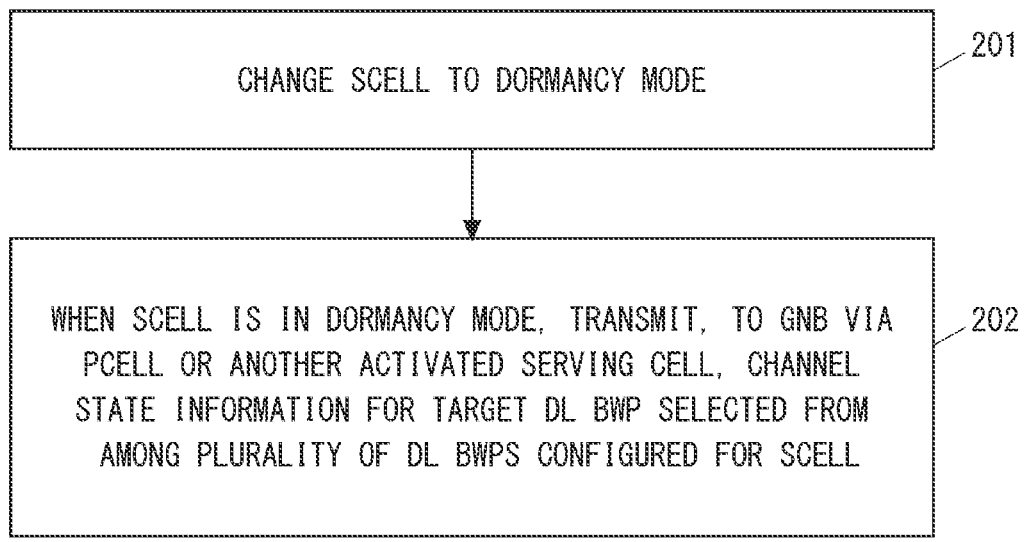
FIG. 2 is a flowchart showing an example of an operation of a radio terminal according to a first embodiment.

FIG. 2 shows an example of an operation of the UE 2 according to the present embodiment. In step 201, the UE 2 changes the SCell 20 to the dormancy mode. The change of the SCell 20 to the dormancy mode may be instructed from the gNB 1 to the UE 2 by means of a notification of state transition regarding dormant state (i.e., Hibernation Medium Access Control (MAC) control element (CE)), or via both a notification of state transition regarding activation (i.e., Activation/Deactivation MAC CE) and a notification of state transition regarding the dormant state (i.e., Hibernation MAC CE). In other words, the UE 2 may change the SCell 20 to the dormant state in response to receiving, in any of the serving cells, a notification of state transition regarding the dormant state (i.e., Hibernation MAC CE), or both a notification of state transition regarding activation (i.e., Activation/Deactivation MAC CE) and a notification of state transition regarding the dormant state (i.e., Hibernation MAC CE).

Additionally or alternatively, the UE 2 may change the SCell 20 to the dormant state in response to expiration of a certain timer (i.e., SCell Hibernation Timer) for transition of the SCell 20 to the dormant state. This timer is configured by the UE 2 by the gNB 1. Similarly, the gNB 1 controls the corresponding certain timer according to data transmission to the UE 2 or data reception from the UE 2 in the SCell 20, thereby synchronizing its management of the state of the SCell 20 with that performed in the UE 2. Additionally or alternatively, the SCell 20 may be set to the dormancy mode if the UE 2 has received, from the gNB 1 during SCell addition, an RRC configuration indicating that the SCell 20 is needs to be initially dormant. In other words, the SCell 20 may be set to the dormancy mode if the UE 2 has received, from the gNB 1 during SCell addition, an RRC configuration indicating that the initial state of the SCell 20 is dormancy mode. Additionally or alternatively, the SCell 20 may be set to the dormancy mode if the UE 2 has received, from the gNB 1 during handover, SCell change, or SCell modification, an RRC configuration indicating that the SCell 20 needs to be transitioned to the dormancy mode (dormant).

In step 202, when the SCell 20 is in the dormancy mode, the UE 2 measures CSI in a target DL BWP selected from one or a plurality of DL BWPs (i.e., a DL BWP set) configured for the SCell 20. The UE 2 then transmits the CSI measured in the target DL BWP to the gNB 1 via the PCell 10 or another activated serving cell. In other words, when the SCell 20 is in the dormancy mode, the gNB 1 receives the CSI for the SCell 20 measured in the target DL BWP from the UE 2. Consequently, for example, the gNB 1 can determine whether to activate the SCell 20 again while considering radio quality of the SCell (and in particular of the target DL BWP).

The CSI report for the SCell 20 in the dormancy mode may indicate one or any combination of Channel Quality Indicator (CQI), Precoding Matrix Index (PMI), Rank Indicator (RI), Precoding Type Indicator (PTI), and CSI-Reference Signal (RS) Resource Indicator (CRI).

In an example, the target DL BWP of the CSI measurement in the dormancy mode may be an active DL BWP that was used immediately before the SCell 20 is transitioned to the dormancy mode (i.e., used when the SCell 20 had been activated). In other words, the UE 2 may measure CSI on the active DL BWP that was used immediately before the SCell 20 is transitioned to the dormancy mode (i.e., used when the SCell 20 had been activated).

More specifically, when the SCell 20 is changed from activated to the dormancy mode (dormant), the UE 2 may keep staying in the latest active DL BWP and measure CSI in this BWP. Furthermore, when the SCell 20 is activated from the dormant state, the UE 2 may perform the activation of the SCell 20 in this BWP, or switch from this BWP to the first active BWP.

In another example, the target DL BWP for the CSI measurement in the dormant state may be the first active BWP of the SCell 20. In other words, when the SCell 20 is in dormancy mode, the UE 2 may measure CSI on the first active BWP of the SCell 20. The first active BWP is a DL BWP that the UE 2 should use from (or immediately after) when a radio connection establishment (RRC Connection Setup) is completed in a certain serving cell (e.g., PCell 10), or a DL BWP that the UE 2 should first use when a serving cell (e.g., SCell 20) is activated. The first active BWP is indicated via RRC signalling by the gNB 1.

More specifically, when the SCell 20 is changed from activated to the dormancy mode (dormant) in subframe #n, the UE 2 may switch from the active DL BWP to the first active BWP and transmit a valid CSI report within x subframes at the latest (i.e., by subframe #n+x). The x subframes correspond to a BWP switch delay and a delay allowed for CQI calculation. Note that, the control may be done on a slot or symbol (e.g., OFDM symbol) basis, instead of on a subframe basis. For example, when the SCell 20 is changed from activated to the dormancy mode (dormant) in slot #m or symbol #1 of the subframe #n, the UE 2 may switch from the active DL BWP to the first active BWP and transmit a valid CSI report within x slots or x symbols at the latest.

In 3GPP Release 15 NR, when a BWP has been activated, the UE 2 should generally monitor a PDCCH in the active BWP. In the exceptional case where the active BWP belongs to an SCell and cross-carrier scheduling from another serving cell (e.g., PCell) to the SCell is configured, the UE 2 does not need to monitor a PDCCH in the active BWP of the SCell. On the other hand, as described above, the UE does not monitor a PDCCH in the dormant SCell state (or in an SCell in the dormancy mode). Accordingly, regardless of whether cross-carrier scheduling is configured for the SCell 20, the UE 2 does not need to monitor a PDCCH in the target DL BWP while the SCell 20 is in the dormant state. In an example, the target DL BWP for the CSI measurement while the SCell 20 is in the dormant state may be referred to as a dormant BWP. The target DL BWP (e.g., dormant BWP) for the CSI measurement in the dormant SCell state may be indicated by a first active DL BWP information element contained in RRC signalling. In other words, the UE 2 may consider the DL BWP indicated by the first active DL BWP information element (i.e., the first active DL BWP) to be the target DL BWP for the CSI measurement in the dormant SCell state. Alternatively, a dormant DL BWP information element may be newly defined in order to indicate, in RRC signalling, the target DL BWP for the CSI measurement while the SCell 20 is in the dormancy mode.

In still another example, the target DL BWP for the CSI measurement in the dormancy mode may be the initial DL BWP of the SCell 20. The initial DL BWP is configured with a control resource set for a Common Search Space (i.e., Type0-PDCCH common search space). The initial DL BWP is a BWP where the UE initially stays when accessing a serving cell (i.e., when transitioning from RRC_IDLE to RRC_CONNECTED). In other words, the UE 2 may measure CSI on the initial DL BWP of the SCell 20 when the SCell 20 is in the dormancy mode.

More specifically, when the SCell 20 is changed from activated to the dormancy mode (dormant) in subframe #n, the UE 2 may switch from the active DL BWP to the initial BWP and transmit a valid CSI report within x subframes at the latest (i.e., by subframe #n+x). The x subframes correspond to a BWP switch delay and a delay allowed for CQI calculation. As in the above-described example of the first active BWP, the control may be done on a slot or symbol (e.g., OFDM symbol) basis, instead of on a subframe basis. Furthermore, when the SCell 20 is activated from the dormancy mode, the UE 2 may perform the activation of the SCell 20 in the initial BWP, or switch from the initial BWP to the first active BWP. The initial BWP may be referred to as a reference BWP, a primary BWP, an anchor BWP, or a master BWP. Depending on the configuration made by the gNB 1, the initial DL BWP may be the same as or different from the first active BWP. In other words, the initial BWP and the first active BWP of the UE 2 set by the gNB 1 may be the same BWP.

In yet still another example, the target DL BWP for the CSI measurement in the dormant state may be the default DL BWP. The default DL BWP is a BWP to which the UE 2 switches from the current active BWP in response to expiration of an inactivity timer (i.e., BWP Inactivity Timer). In other words, when the SCell 20 is in the dormant state, the UE 2 may measure CSI on the default DL BWP of the SCell 20. If the default DL BWP has not been explicitly configured, the UE 2 may instead switch to the initial DL BWP of the SCell 20 in response to expiration of the inactivity timer, and then measure CSI.

More specifically, when the SCell 20 is changed from activated to the dormancy mode (dormant) in subframe #n, the UE 2 may switch from the active DL BWP to the default DL BWP and transmit a valid CSI report within x subframes at the latest (i.e., by subframe #n+x). The x subframes correspond to a BWP switch delay and a delay allowed for CQI calculation. As in the example of the above-described first active BWP, the control may be done on a slot or symbol (e.g., OFDM symbol) basis, instead of on a subframe basis. Furthermore, when the SCell 20 is activated from the dormancy mode, the UE 2 may perform the activation of the SCell 20 in the default DL BWP, or switch from the default DL BWP to the first active BWP.

In some implementations, the target DL BWP for the CSI measurement in the dormancy mode may be predetermined. In an example, if the target DL BWP for the CSI measurement in the dormancy mode is not indicated by the gNB 1, the UE 2 may determine the BWP (e.g., initial BWP) having the BWP-Id=0 to be the target DL BWP for the CSI measurement, according to a default MAC configuration. Additionally or alternatively, the gNB 1 may indicate, to the UE 2, the target DL BWP for the CSI measurement in the SCell in the dormancy mode. More specifically, the gNB 1 may transmit, to the UE 2, configuration information (e.g., dormant BWP information) explicitly or implicitly indicating the target DL BWP.

Figure 3:
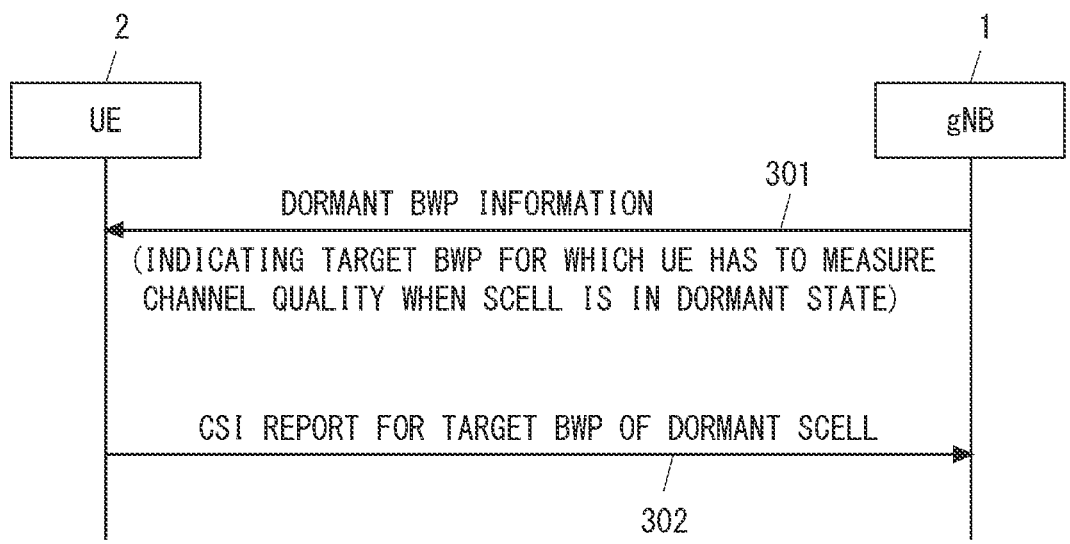
FIG. 3 is a sequence diagram showing an example of operations of a radio access network node and a radio terminal according to the first embodiment.

FIG. 3 shows an example of operations of the gNB 1 and the UE 2. In step 301, the gNB 1 transmits, to the UE 2, configuration information (e.g., dormant BWP information) indicating the target DL BWP for the CSI measurement in the dormant state. The gNB 1 may transmit the configuration information to the UE 2 via system information (e.g., SIB Type 1 (SIB1)). Alternatively, the gNB 1 may transmit the configuration information to the UE 2 via RRC signalling.

The configuration information may indicate the target DL BWP for the CSI measurement in the dormancy mode that has been selected by the gNB 1 from among a plurality of candidate BWPs including at least the latest active DL BWP (or the current active BWP) and the first active DL BWP. For example, the configuration information may indicate at least one of the first active DL BWP, the initial DL BWP, the default DL BWP, and the latest active DL BWP (or the current active DL BWP). The configuration information may indicate the above-described dormant DL BWP.

Alternatively, the configuration information may indicate one selected by the gNB 1 from a plurality of predetermined candidate BWPs. For example, the configuration information may indicate one that has been selected by the gNB 1 from among candidate BWPs that include one or more of the first active DL BWP, the initial DL BWP, the default DL BWP, and the latest active DL BWP (or the current active DL BWP).

Additionally or alternatively, the configuration information may indicate a BWP identifier (e.g., BWP-Id) of the target DL BWP.

The gNB 1 may implicitly indicate that the target DL BWP is a predetermined DL BWP, by not transmitting configuration information that explicitly indicates the target DL BWP. The predetermined DL BWP may be any one of the above BWPs, which includes the first active DL BWP, the initial DL BWP, the default DL BWP, and the latest active DL BWP (or the current active DL BWP).

In step 302, while the SCell 20 is in the dormancy mode, the UE 2 measures channel quality in the target BWP indicated by the gNB 1 and transmits a CSI report for the SCell 20 to the gNB 1 via the PCell 10 or another activated serving cell. While the SCell 20 is in the dormancy mode, the UE 2 does not need to monitor a PDCCH in the target BWP indicated by the gNB 1.

As understood from the above description, in the present embodiment, the UE 2 is configured to, when the SCell 20 is in the dormancy mode, transmit, to the gNB 1 via the PCell 10 or another activated serving cell, a CSI report for a target DL BWP selected from a plurality of DL BWPs (i.e., a DL BWP set) configured for the SCell 20. That is, the present embodiment enables the UE 2 to perform a CSI measurement for the dormant SCell that has been configured with a plurality of BWPs. Consequently, for example, the gNB 1 can determine whether to activate the SCell 20 again while considering radio quality of the SCell (and in particular of the target DL BWP).

A MAC entity of the UE 2 according to the present embodiment may operate as follows for each TTI and for each configured SCell.

If the MAC entity is configured with a dormant SCell by an SCell configuration, or if the MAC entity receives a MAC control element(s) for transitioning an SCell to the dormant state in the TTI, then the MAC entity transitions the SCell to the dormant state, stops an sCellDeactivationTimer associated with the SCell, and starts or restarts a dormantSCell-DeactivationTimer associated with the SCell.

If an sCellHibernationTimer associated with an activated SCell expires in the TTI, then the MAC entity hibernates the SCell, stops an sCellDeactivationTimer associated with the SCell, and stops the sCellHibernationTimer associated with the SCell.

If a dormantSCellDeactivationTimer associated with a dormant SCell expires in the TTI, the MAC entity deactivates the SCell, and stops the dormantSCellDeactivation-Timer associated with the SCell.

If an SCell is in the dormant state, then the MAC entity does not transmit Sounding Reference Symbols (SRS) in the TTI; reports one or any combination of CQI, PMI, RI, PTI, and CRI for the SCell in accordance with periodicity indicated by RRC; does not transmit Uplink Shared Channel(s) (UL-SCH) in the SCell; does not transmit Random Access Channel(s) (RACH) in the SCell; does not monitor PDCCH on the SCell; does not monitor PDCCH for the SCell; and does not transmit Physical Uplink Control Channel (PUCCH) in the SCell.

The UE 2 according to the present embodiment may also perform the following BWP operations. In an example, upon initiation of SCell state transition to the dormant state in a serving cell, the MAC entity transitions the active DL BWP for the serving cell to the dormant state (or the dormant DL BWP).

In another example, upon initiation of SCell state transition to the dormant state in a serving cell, if the (current) active DL BWP for the serving cell is not a DL BWP indicated by a firstActiveDownlinkBWP-Id, then the MAC entity switches the active DL BWP to the DL BWP indicated by the firstActiveDownlinkBWP-Id and further transitions the active DL BWP to the dormant state (or the dormant DL BWP).

In still another example, upon initiation of SCell state transition to the dormant state in a serving cell, if the (current) active DL BWP for the serving cell is not the initial Downlink BWP, then the MAC entity switches the active DL BWP to the initial Downlink BWP and further transitions the active DL BWP to the dormant state (or the dormant DL BWP).

In yet still another example, upon initiation of SCell state transition to the dormant state in a serving cell, if a defaultDownlinkBWP-Id has been configured, and if the (current) active DL BWP is not a DL BWP indicated by the defaultDownlinkBWP-Id, then the MAC entity transitions the active DL BWP to the DL BWP indicated by the defaultDownlinkBWP-Id and further transitions the active DL BWP to the dormant state (or the dormant DL BWP). On the other hand, if the defaultDownlinkBWP-Id has not been configured, and if the (current) active DL BWP is not the initial Downlink BWP, then the MAC entity switches the active DL BWP to the initial Downlink BWP and further transitions the active DL BWP to the dormant state (or the dormant DL BWP).

In some of the above-described examples of the BWP operations, the MAC entity of the UE 2 first switches the active DL BWP and thereafter transitions the active DL BWP to the dormant state (or the dormant DL BWP). Instead of this, upon initiation of SCell state transition to the dormant state, the MAC entity may transition the active DL BWP for the SCell to the dormant state (or the dormant DL BWP) while switching the (current) active DL BWP to anther DL BWP (e.g., the first active BWP, the initial BWP, or the default BWP) to be used during the dormant state.

Second Embodiment

A configuration example of a radio communication network according to the present embodiment may be similar to the example shown in FIG. 1. The gNB 1 according to the present embodiment controls state transition of the UE 2 among RRC_CONNECTED, RRC_INACTIVE, and RRC_IDLE states. For this control, the gNB 1 may transmit, to the UE 2, an RRC message (e.g., RRC setup, RRC release, and RRC release with suspend) that instructs the UE 2 to perform state transition. Additionally or alternatively, the gNB 1 may provide the UE 2 with an RRC configuration (e.g., a configuration of an inactivity timer that triggers state transition).

The UE 2 according to the present embodiment controls state transition of the UE 2 among RRC_CONNECTED, RRC_INACTIVE, and RRC_IDLE states in accordance with the instruction or configuration sent from the gNB 1. Besides, the UE 2 according to the present embodiment controls state transition of the UE 2 among RRC_CONNECTED, RRC_INACTIVE, and RRC_IDLE states, in response to the state of the UE 2 (e.g., arrival of data to be transmitted on uplink).

The following describes the definition of the RRC_CONNECTED, RRC_INACTIVE, and RRC_IDLE states. The RRC_CONNECTED and RRC_IDLE states of the 5G system have features similar to those of the RRC_CONNECTED and RRC_IDLE states of LTE, respectively. When the UE is in the RRC_CONNECTED state, the UE and the 5G RAN (e.g., NG-RAN) maintain an Access Stratum (AS) context, and the location of the UE is known to the NG-RAN at cell level. Mobility of the UE in the RRC_CONNECTED state is handled by a handover controlled by the NG-RAN.

On the other hand, when the UE is in the RRC_IDLE state, the UE and the NG-RAN have released the AS context. When the UE is in the RRC_IDLE state, the location of the UE is not known to the NG-RAN, but the location of the UE is known to the 5G CN (e.g., 5GC) at location registration area level. Like in LTE, the location registration area corresponds to one or more tracking areas. Mobility of the UE in the RRC_IDLE state is handled by cell reselection controlled by the UE.

It can be said that the RRC_INACTIVE state is an intermediate state between the RRC_CONNECTED state and the RRC_IDLE state. Some features of the RRC_INACTIVE state are similar to those of the RRC_CONNECTED state, while some other features of the RRC_INACTIVE state are similar to those of the RRC_IDLE state.

When the UE is in the RRC_INACTIVE state, the UE and the NG-RAN maintain at least part of the AS context. The AS context held by the UE and the NG-RAN for the UE in the RRC_INACTIVE state includes, for example, a radio bearer configuration and an AS security context. Further, the NG-RAN keeps the control-plane and user-plane connections (i.e., NG-c and NG-u interfaces) with the 5GC for the UE in the RRC_INACTIVE state established. The UE in the RRC_INACTIVE state is considered to be in the NG-CM-CONNECTED state in the UE and the 5GC. Accordingly, the 5G-CN does not need to distinguish whether the UE is in the RRC_CONNECTED state or the RRC_INACTIVE state. These features of the RRC_INACTIVE state are similar to those of the RRC_CONNECTED state.

However, mobility of the UE in the RRC_INACTIVE state is similar to that of the UE in the RRC_IDLE state. Specifically, the mobility of the UE in the RRC_INACTIVE state is handled by the cell reselection controlled by the UE.

The location of the UE in the RRC_INACTIVE state is known to the NG-RAN at a RAN Notification Area (RNA) level. The RAN notification area is also referred to as a RAN-based Notification Area, a RAN paging area, or a RAN location update area. The RAN notification area (RNA) includes one or more cells and is determined by the NG-RAN. The NG-RAN notifies the UE of the RNA. Additionally or alternatively, the RAN notification area (RNA) may include one or more RAN areas. The identifier of a RAN area (i.e., RAN area code) is set per PLMN and is broadcast via system information (e.g., SIB1). Even when the UE in the RRC_INACTIVE state moves between cells by cell reselection within the RAN notification area, the UE does not need to notify (or report to) the NG-RAN that it has performed the cell reselection. The UE in the RRC_INACTIVE state performs the procedure for updating its RAN notification area (RNA update) with the NG-RAN (e.g., gNB), in response to reselecting a cell outside the RAN notification area.

As described above, IDLE mode measurements are introduced for enhancements to carrier aggregation. It may be preferable that a UE in RRC_INACTIVE can perform measurements of inter-frequency carriers, similar to measurements of inter-frequency carriers by a UE in RRC_IDLE. This contributes to quick setup of an SCell when a UE transitions from RRC_INACTIVE to RRC_CONNECTED.

Figure 4:
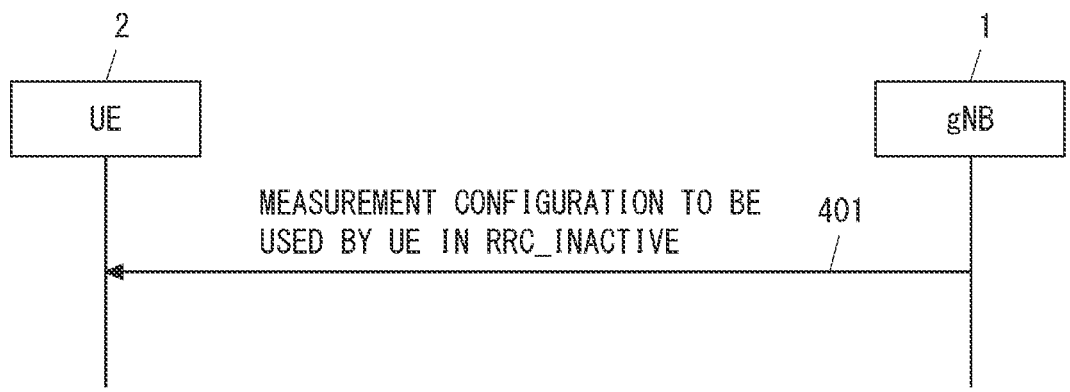
FIG. 4 is a sequence diagram showing an example of operations of a radio access network node and a radio terminal according to a second embodiment.

In order to achieve this, as shown in FIG. 4, the gNB 1 according to the present embodiment transmits, to the UE 2, a measurement configuration that causes the UE 2 in RRC_INACTIVE to perform a measurement for at least one carrier frequency (step S401). More specifically, the gNB 1 may transmit the measurement configuration via an RRC message indicating transition from RRC_CONNECTED to RRC_INACTIVE (e.g., RRC release with suspend, or RRC suspend). Alternatively, the gNB 1 may transmit the measurement configuration via system information including configuration information about measurements of radio quality in RRC_INACTIVE and RRC_IDLE states (e.g., SIB Type 2 (SIB2)).

In some implementations, a part or all of the measurement configuration for measurements in RRC_INACTIVE may belong to a measurement configuration for measurements in RRC_IDLE. In other words, a part or all of the measurement configuration for measurements in RRC_IDLE may be reused for the measurement configuration for measurements in RRC_INACTIVE. For example, a RAN notification area may be used in measurements in RRC_INACTIVE instead of the above-described validity area for measurements in RRC_IDLE.

Specifically, the measurement configuration for a measurement in RRC_IDLE (or IDLE mode measurement) may also be used as the measurement configuration for a measurement in RRC_INACTIVE (or inactive state measurement) (e.g., MeasIdleInactiveConfig IE). The UE may perform the IDLE mode measurement when an RRC message indicative of state transition, received from the NG-RAN (e.g., gNB), indicates transition to RRC_IDLE, and on the other hand may perform the inactive state measurement when the RRC message indicates transition to RRC_INACTIVE. In this instance, part of sub-information (e.g., an IE or a field) of the measurement configuration (e.g., MeasIdleInactiveConfig IE) may differ between the IDLE mode measurement and the inactive state measurement. For example, the validity area in the IDLE mode measurement may be a cell(s), whereas that in the inactive state measurement may be a RAN notification area (RNA).

Alternatively, the measurement configuration (e.g., MeasInactiveConfig IE) for a measurement in RRC_INACTIVE (or inactive state measurement) may be defined separately from the measurement configuration (e.g., MeasIdleConfig IE) for a measurement in RRC_IDLE (or IDLE mode measurement). In this instance, part of sub-information (e.g., IEs or fields) included in these measurement configurations may be the same or different.

Figure 5:
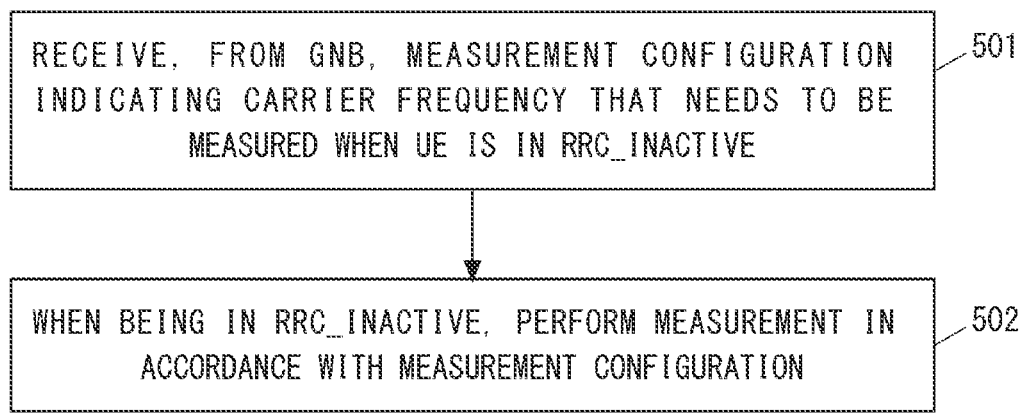
FIG. 5 is a flowchart showing an example of an operation of a radio terminal according to the second embodiment.

FIG. 5 shows an example of an operation of the UE 2 according to the present embodiment. In step 501, the UE 2 receives, from the gNB 1, a measurement configuration indicating a carrier frequency needs to be measured when the UE 2 is in RRC_INACTIVE. In step 502, the UE 2 performs measurements in accordance with the measurement configuration when the UE 2 is in RRC_INACTIVE.

Figure 6:
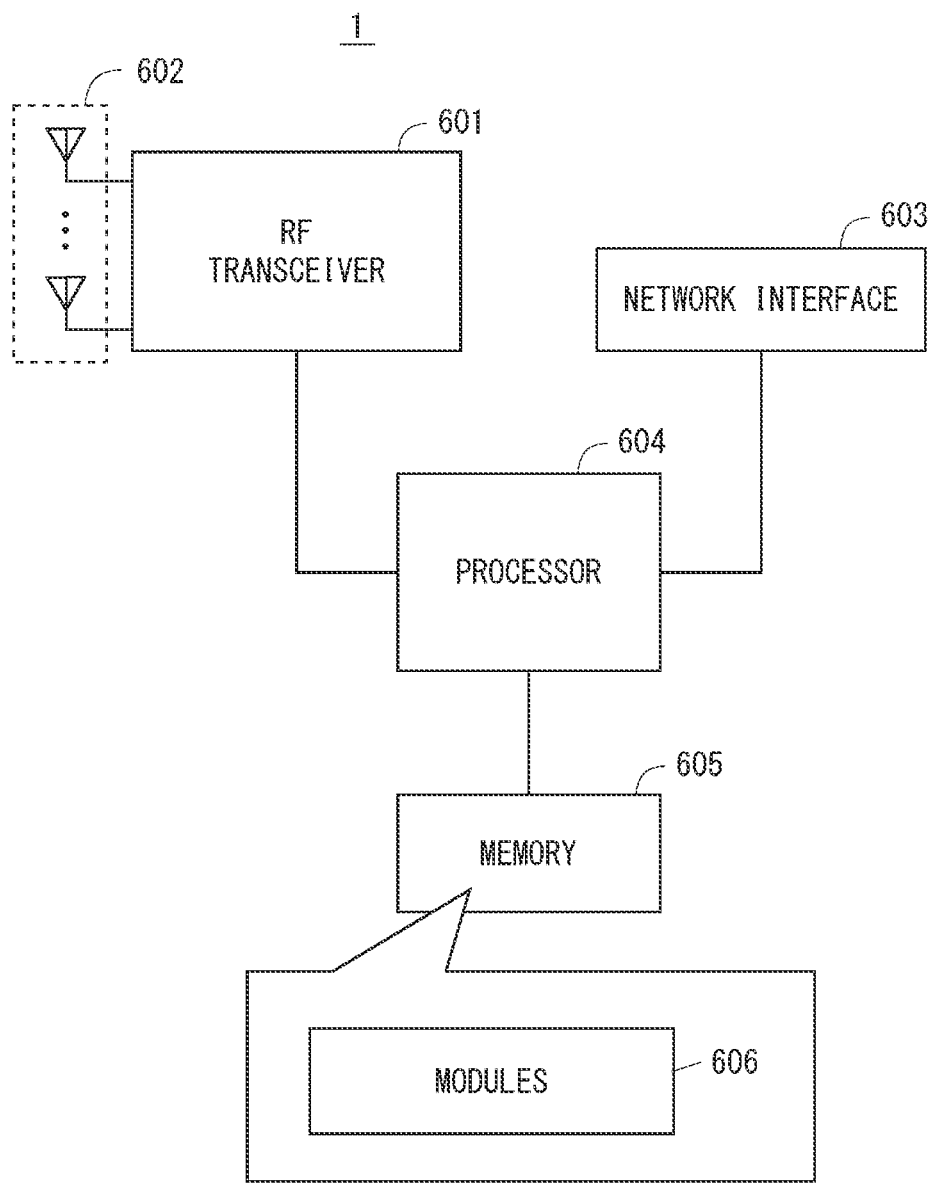
FIG. 6 is a block diagram showing a configuration example of a radio access network node according to embodiments.

The following provides configuration examples of the gNB 1 and the UE 2 according to the above-described embodiments. FIG. 6 is a block diagram showing a configuration example of the gNB 1 according to the above-described embodiments. Referring to FIG. 6, the gNB 1 includes a Radio Frequency transceiver 601, a network interface 603, a processor 604, and a memory 605. The RF transceiver 601 performs analog RF signal processing to communicate with NG UEs including the UE 2. The RF transceiver 601 may include a plurality of transceivers. The RF transceiver 601 is coupled to an antenna array 602 and the processor 604. The RF transceiver 601 receives modulated symbol data from the processor 604, generates a transmission RF signal, and supplies the transmission RF signal to the antenna array 602. Further, the RF transceiver 601 generates a baseband reception signal based on a reception RF signal received by the antenna array 602 and supplies the baseband reception signal to the processor 604. The RF transceiver 601 may include an analog beamformer circuit for beam forming. The analog beamformer circuit includes, for example, a plurality of phase shifters and a plurality of power amplifiers.

The network interface 603 is used to communicate with network nodes (e.g., a control node and a transfer node of 5G Core). The network interface 603 may include, for example, a network interface card (NIC) conforming to the IEEE 802.3 series.

The processor 604 performs digital baseband signal processing (i.e., data-plane processing) and control-plane processing for radio communication. The processor 604 may include a plurality of processors. The processor 604 may include, for example, a modem processor (e.g., a Digital Signal Processor (DSP)) that performs digital baseband signal processing and a protocol stack processor (e.g., a Central Processing Unit (CPU) or a Micro Processing Unit (MPU)) that performs the control-plane processing. The processor 604 may include a digital beamformer module for beam forming. The digital beamformer module may include a Multiple Input Multiple Output (MIMO) encoder and a pre-coder.

The memory 605 is composed of a combination of a volatile memory and a non-volatile memory. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 605 may include a storage located apart from the processor 604. In this case, the processor 604 may access the memory 605 via the network interface 603 or an I/O interface (not shown).

The memory 605 may store one or more software modules (computer programs) 606 including instructions and data to perform processing by the gNB 1 described in the above-described embodiments. In some implementations, the processor 604 may be configured to load the software modules 606 from the memory 605 and execute the loaded software modules, thereby performing processing of the gNB 1 described in the above-described embodiments When the gNB 1 is a gNB-CU, the gNB 1 does not need to include the RF transceiver 601 (and the antenna array 602).

Figure 7:
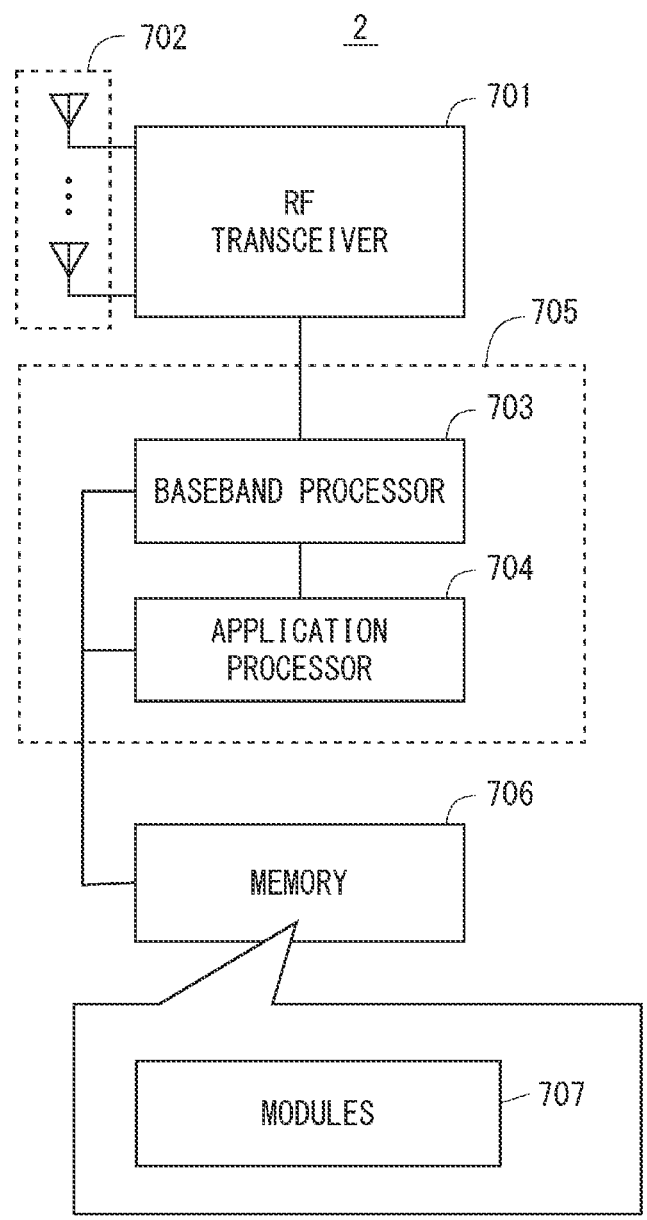
FIG. 7 is a block diagram showing a configuration example of a radio terminal according to embodiments.

FIG. 7 is a block diagram showing a configuration example of the UE 2. A Radio Frequency (RF) transceiver 701 performs analog RF signal processing to communicate with the gNB 1. The RF transceiver 701 may include a plurality of transceivers. The analog RF signal processing performed by the RF transceiver 701 includes frequency up-conversion, frequency down-conversion, and amplification. The RF transceiver 701 is coupled to an antenna array 702 and a baseband processor 703. The RF transceiver 701 receives modulated symbol data (or OFDM symbol data) from the baseband processor 703, generates a transmission RF signal, and supplies the transmission RF signal to the antenna array 702. Further, the RF transceiver 701 generates a baseband reception signal based on a reception RF signal received by the antenna array 702 and supplies the baseband reception signal to the baseband processor 703. The RF transceiver 701 may include an analog beamformer circuit for beam forming. The analog beamformer circuit includes, for example, a plurality of phase shifters and a plurality of power amplifiers.

The baseband processor 703 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 703 may include, for example, signal processing of a Service Data Adaptation Protocol (SDAP) layer, a Packet Data Convergence Protocol (PDCP) layer, a Radio Link Control (RLC) layer, a MAC layer, and a PHY layer. Further, the control-plane processing performed by the baseband processor 703 may include processing of a Non-Access Stratum (NAS) protocol, an RRC protocol, and MAC CEs.

The baseband processor 703 may perform MIMO encoding and pre-coding for beam forming.

The baseband processor 703 may include a modem processor (e.g., DSP) that performs the digital baseband signal processing and a protocol stack processor (e.g., a CPU or an MPU) that performs the control-plane processing. In this case, the protocol stack processor, which performs the control-plane processing, may be integrated with an application processor 704 described in the following.

The application processor 704 is also referred to as a CPU, an MPU, a microprocessor, or a processor core. The application processor 704 may include a plurality of processors (processor cores). The application processor 704 loads a system software program (Operating System (OS)) and various application programs (e.g., a call application, a WEB browser, a mailer, a camera operation application, and a music player application) from a memory 706 or from another memory (not shown) and executes these programs, thereby providing various functions of the UE 2.

In some implementations, as represented by a dashed line (705) in FIG. 7, the baseband processor 703 and the application processor 704 may be integrated on a single chip. In other words, the baseband processor 703 and the application processor 704 may be implemented in a single System on Chip (SoC) device 705. An SoC device may be referred to as a Large Scale Integration (LSI) or a chipset.

The memory 706 is a volatile memory, a non-volatile memory, or a combination thereof. The memory 706 may include a plurality of memory devices that are physically independent from each other. The volatile memory is, for example, an SRAM, a DRAM, or a combination thereof. The non-volatile memory is, for example, an MROM, an EEPROM, a flash memory, a hard disc drive, or any combination thereof. The memory 706 may include, for example, an external memory device that can be accessed from the baseband processor 703, the application processor 704, and the SoC 705. The memory 706 may include an internal memory device that is integrated in the baseband processor 703, the application processor 704, or the SoC 705. Further, the memory 706 may include a memory in a Universal Integrated Circuit Card (UICC).

The memory 706 may store one or more software modules (computer programs) 707 including instructions and data to perform the processing by the UE 2 described in the above-described embodiments. In some implementations, the baseband processor 703 or the application processor 704 may load these software modules 707 from the memory 706 and execute the loaded software modules, thereby performing the processing of the UE 2 described in the above-described embodiments with reference to the drawings.

Note that the control-plane processing and operations performed by the UE 2 described in the above-described embodiments can be achieved by the elements other than the RF transceiver 701 and the antenna array 702, i.e., achieved by at least one of the baseband processor 703 and the application processor 704, and a memory 706 storing the software module 707.

As described above with reference to FIGS. 6 and 7, each of the processors that the gNB 1 and UE 2 according to the above embodiments include executes one or more programs including instructions for causing a computer to execute an algorithm described with reference to the drawings. This program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Embodiments

Each of the above-described embodiments may be used individually or two or more embodiments may be appropriately combined with one another. For example, the second embodiment does not always necessitate details of the operations regarding the CSI measurements for the SCell in dormancy mode described in the first embodiment. Put another way, the second embodiment may be executed independently from the first embodiment and contributes to solving objects or problems different from those to be solved by the first embodiment, and also contributes to obtaining advantages different from those to be obtained by the first embodiment.

The above-described first embodiment can be applied to CSI measurements for various reference signals (RS). For example, CSI measurements may be performed for a CSI-RS or an SSB, or it may be performed for another newly defined RS. The RS-type used for the CSI measurements for the SCell in the dormant state may be specified by an NG-RAN node (e.g., the gNB 1) to the UE 2 via RRC signaling (e.g., csi-RS-Resource Set List, or csi-SSB-Resource Set List).

The above-described first embodiment can be applied to CSI measurements for a secondary cell in a Master Cell Group (MCG) and a secondary cell in a Secondary Cell Group (SCG) of Dual Connectivity (DC). The Dual Connectivity may be an EUTRA-NR DC (EN-DC) between an LTE eNB and an NR gNB. Alternatively, the Dual Connectivity may be Dual Connectivity (NR-DC) between two gNBs connected to 5GC, or Multi-RAT Dual Connectivity (MR-DC) between NG-RAN nodes of different RATs. Similarly, the above-described third embodiment may be applied to measurements of inter-frequency carriers for Dual Connectivity. The NR-DC and the above-described MR-DC may be collectively defined as Multi-Radio Dual Connectivity (MR-DC).

In the above-described second embodiment, the UE 2 may perform DC when the UE 2 is in RRC_CONNECTED, and thereafter transition to RRC_INACTIVE while maintaining at least part of the configuration of the SCG under the instruction from an NG-RAN node (e.g., the gNB 1). In this case, while being in RRC_INACTIVE, the UE 2 may perform measurements for a frequency (e.g., a frequency used as the secondary RAT or the SCG) specified by the Secondary gNB (e.g., the gNB 1 or another gNB) of the DC. This enables quickly and appropriately configuring the SCG when the UE 2 again transitions to RRC_CONNECTED.

The UE in the present disclosure is an entity connected to a network via a wireless interface. It should be noted that the UE in the present disclosure is not limited to a dedicated communication device and can be any device as follows having a communication function herein explained.

The terms "User Equipment" or "UE" (as the term is used by 3GPP), "mobile station", "mobile terminal", "mobile device", and "radio terminal" are generally intended to be synonymous with one another. The UE may include standalone mobile stations, such as terminals, cell phones, smart phones, tablets, cellular IoT (internet of things) terminals, and IoT devices. It will be appreciated that the terms "UE" and "radio terminal" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper projecting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motorcycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be an item of trade and/or service industry equipment, a vending machine, an automatic service machine, an office machine or equipment, a consumer electronic and electronic appliance (for example a consumer electronic appliance such as: audio equipment; a speaker; a radio; video equipment; a television etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies. IoT devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a stationary apparatus. IoT devices may also be embedded in non-stationary apparatus (e.g. vehicles) or attached to animals or persons to be monitored/tracked. It will be appreciated that IoT technology can be implemented on any communication devices that can connect to a communications network for sending/receiving data, regardless of whether such communication devices are controlled by human input or software instructions stored in memory. It will be appreciated that IoT devices are sometimes also referred to as Machine-Type Communication (MTC) devices, Machine-to-Machine (M2M) communication devices, or Narrow Band-IoT (NB-IoT) UE.

It will be appreciated that a UE may support one or more IoT or MTC applications.

Some examples of MTC applications are listed in 3GPP TS 22.368 V13.2.0 (2017-01-13), Annex B (the contents of which are incorporated herein by reference). This list is not exhaustive and is intended to be indicative of some examples of MTC applications. In this list, the Service Area of the MTC applications includes Security, Tracking & Tracing, Payment, Health, Remote Maintenance/Control, Metering, and Consumer Devices.

Examples of the MTC applications regarding Security include Surveillance systems, Backup for landline, Control of physical access (e.g. to buildings), and Car/driver security.

Examples of the MTC applications regarding Tacking & Tracing include Fleet Management, Order Management, Telematics insurance: Pay as you drive (PAYD), Asset Tracking, Navigation, Traffic information, Road tolling, and Road traffic optimisation/steering.

Examples of the MTC applications regarding Payment include Point of sales (POS), Vending machines, and Gaming machines.

Examples of the MTC applications regarding Health include Monitoring vital signs, Supporting the aged or handicapped, Web Access Telemedicine points, and Remote diagnostics.

Examples of the MTC applications regarding Remote Maintenance/Control include Sensors, Lighting, Pumps, Valves, Elevator control, Vending machine control, and Vehicle diagnostics.

Examples of the MTC applications regarding Metering include Power, Gas, Water, Heating, Grid control, and Industrial metering.

Examples of the MTC applications regarding Consumer Devices include Digital photo frame, Digital camera, and eBook.

Applications, services, and solutions may be an Mobile Virtual Network Operator (MVNO) service/system, an emergency radio communication service/system, a Private Branch eXchange (PBX) service/system, a PHS/Digital Cordless Telecommunications service/system, a Point of sale (POS) service/system, an advertise calling service/system, a Multimedia Broadcast and Multicast Service (MBMS) service/system, a Vehicle to Everything (V2X) service/system, a train radio service/system, a location related service/system, a Disaster/Emergency Wireless Communication Service/system, an Internet of Things (IoT) service/system, a community service/system, a video streaming service/system, a femto cell application service/system, a Voice over LTE (VoLTE) service/system, a radio tag service/system, a charging service/system, a radio on demand service/system, a roaming service/system, an activity monitoring service/system, a telecom carrier/communication NW selection service/system, a functional restriction service/system, a Proof of Concept (PoC) service/system, a personal information management service/system, a display video service/system, a non-communication service/system, an ad-hoc network/Delay Tolerant Networking (DTN) service/system, etc.

The above-described UE categories are merely examples of applications of the technical ideas and embodiments described in the present disclosure. The UE described in this disclosure is not limited to these examples and various modifications can be made thereto by those skilled in the art.

Further, the above-described embodiments are merely examples of applications of the technical ideas obtained by the inventor. These technical ideas are not limited to the above-described embodiments and various modifications can be made thereto.

The whole or part of the exemplary embodiments disclosed above can be described as, but not limited to, the following supplementary notes.

Supplementary Note 1

A radio access network (RAN) node to be placed in a RAN, the RAN node comprising:
at least one memory; and
at least one processor coupled to the at least one memory and configured to control state transitions of a radio terminal among a Radio Resource Control (RRC)_CONNECTED state, an RRC_INACTIVE state, and an RRC_IDLE state, wherein
the RRC_CONNECTED state is a state in which the radio terminal and the RAN maintain an access stratum (AS) context and in which a location of the radio terminal is known to the RAN at cell level,
the RRC_INACTIVE state is a state in which the radio terminal and the RAN maintain at least part of the AS context and in which the location of the radio terminal is known to the RAN at RAN notification area level configured by the RAN,
the RRC_IDLE state is a state in which the radio terminal and the RAN have released the AS context and in which the location of the radio terminal is not known to the RAN, and
the at least one processor is further configured to transmit to the radio terminal, via an RRC message instructing transition from the RRC_CONNECTED state to the RRC_INACTIVE state or via system information, a measurement configuration that causes the radio terminal in the RRC_INACTIVE state to perform a measurement of at least one carrier frequency.

Supplementary Note 2

A radio terminal comprising:
at least one memory; and
at least one processor coupled to the at least one memory and configured to control state transitions of a radio terminal among a Radio Resource Control (RRC)_CONNECTED state, an RRC_INACTIVE state, and an RRC_IDLE state, wherein
the RRC_CONNECTED state is a state in which the radio terminal and a radio access network (RAN) maintain an access stratum (AS) context and in which a location of the radio terminal is known to the RAN at cell level,
the RRC_INACTIVE state is a state in which the radio terminal and the RAN maintain at least part of the AS context and in which the location of the radio terminal is known to the RAN at RAN notification area level configured by the RAN,
the RRC_IDLE state is a state in which the radio terminal and the RAN have released the AS context and in which the location of the radio terminal is not known to the RAN, and
the at least one processor is further configured to receive from a RAN node, via an RRC message instructing transition from the RRC_CONNECTED state to the RRC_INACTIVE state or via system information, a measurement configuration that causes the radio terminal in the RRC_INACTIVE state to perform a measurement of at least one carrier frequency.

This application is based upon and claims the benefit of priority from Japanese Patent Application No. 2018-202275, filed on Oct. 26, 2018, the disclosure of which is incorporated herein in its entirety by reference.

REFERENCE SIGNS LIST 1 gNB
2 UE
10 Primary Cell (PCell)
20 Secondary Cell (SCell)
101 Air Interface
604 Processor
605 Memory
703 Baseband Processor
704 Application Processor
706 Memory

What is claimed is:

1. A method performed by a radio terminal, the method comprising:
   communicating with a radio access network (RAN) node via carrier aggregation of a primary cell (PCell) and a secondary cell (SCell), wherein the SCell is configured with a plurality of bandwidth parts, (BWPs), including a dormant BWP in which the radio terminal does not monitor a Physical Downlink Control Channel (PDCCH), but performs Channel State Information (CSI) measurements;
   receiving Radio Resource Control (RRC) signaling including a BWP identifier (ID) indicating the dormant BWP from the RAN node; and
   upon receiving from the RAN node a notification of transition to a dormancy mode in the SCell, performing CSI measurements in the dormant BWP indicated by the BWP ID,
   wherein the RRC signaling includes information related to a first active BWP to be used upon activation of the SCell,
   wherein the information is set to the dormant BWP,
   wherein the RRC signaling includes information related to a periodicity of a report for the CSI measurements, and
   wherein the report for the CSI measurements is performed using the periodicity.

2. The method according to claim 1, further comprising transmitting the report for the CSI measurements to the RAN node via the PCell or another activated serving cell.

3. The method according to claim 1, wherein the dormant BWP is a BWP of a secondary cell in a Master Cell Group (MCG) or a secondary cell in a Secondary Cell Group (SCG).

4. The method according to claim 1, further comprising:
   activating a BWP which is used before receiving the notification in a case where activation of the SCell occurs.

5. The method according to claim 1, wherein transmitting an SRS or transmitting a Random Access Channel (RACH) is stopped in the dormant BWP indicated by the BWP ID.

6. A method performed by a Radio Access Network (RAN) node, the method comprising:
   communicating with a radio terminal via carrier aggregation of a primary cell (PCell) and a secondary cell (SCell), wherein the SCell is configured with a plurality of bandwidth parts (BWPs) including a dormant BWP in which the radio terminal does not monitor a Physical Downlink Control Channel (PDCCH), but performs Channel State Information (CSI) measurements;
   transmitting Radio Resource Control (RRC) signaling including a BWP identifier (ID) indicating the dormant BWP to the radio terminal; and
   transmitting to the radio terminal a notification of transition to a dormancy mode in the SCell,
   wherein the RRC signaling includes information related to a first active BWP to be used upon activation of the SCell,
   wherein the information is set to the dormant BWP,
   wherein the RRC signaling includes information related to a periodicity of a report for the CSI measurements, and
   wherein the report for the CSI measurements is performed using the periodicity.

7. The method according to claim 6, further comprising receiving the report for the CSI measurements from the radio terminal via the PCell or another activated serving cell.

8. The method according to claim 6, wherein
   the RAN node is included in a Dual Connectivity system, and
   the dormant BWP is a BWP of a secondary cell in a Master Cell Group (MCG) or a secondary cell in a Secondary Cell Group (SCG).

9. The method according to claim 6, wherein a BWP which is used before receiving the notification is activated in a case where activation of the SCell occurs.

10. The method according to claim 6, wherein transmitting an SRS or transmitting a Random Access Channel (RACH) is stopped in the dormant BWP indicated by the BWP ID.

11. A radio terminal comprising:
    at least one memory; and
    at least one processor coupled to the at least one memory and configured to:
       communicate with a radio access network (RAN) node via carrier aggregation of a primary cell (PCell) and a secondary cell (SCell), wherein the SCell is configured with a plurality of bandwidth parts, (BWPs), including a dormant BWP in which the radio terminal does not monitor a Physical Downlink Control Channel (PDCCH), but performs Channel State Information (CSI) measurements;
       receive Radio Resource Control (RRC) signaling including a BWP identifier (ID) indicating the dormant BWP from the RAN node; and
       upon receiving from the RAN node a notification of transition to a dormancy mode in the SCell, perform CSI measurements in the dormant BWP indicated by the BWP ID,
    wherein the RRC signaling includes information related to a first active BWP to be used upon activation of the SCell,
    wherein the information is set to the dormant BWP,
    wherein the RRC signaling includes information related to a periodicity of a report for the CSI measurements, and
    wherein the report for the CSI measurements is performed using the periodicity.

12. The radio terminal according to claim 11, wherein the at least one processor is configured to transmit the report for the CSI measurements to the RAN node via the PCell or another activated serving cell.

13. The radio terminal according to claim 11, wherein the dormant BWP is a BWP of a secondary cell in a Master Cell Group (MCG) or a secondary cell in a Secondary Cell Group (SCG).

14. The radio terminal according to claim 11, wherein the at least one processor is configured to activate a BWP which is used before receiving the notification in a case where activation of the SCell occurs.

15. The radio terminal according to claim 11, wherein transmitting an SRS or transmitting a Random Access Channel (RACH) is stopped in the dormant BWP indicated by the BWP ID.

16. A radio access network (RAN) node comprising:
    at least one memory; and
    at least one processor coupled to the at least one memory and configured to:
       communicate with a radio terminal via carrier aggregation of a primary cell (PCell) and a secondary cell (SCell), wherein the SCell is configured with a plurality of bandwidth parts (BWPs) including a dormant BWP in which the radio terminal does not monitor a Physical Downlink Control Channel (PDCCH), but performs Channel State Information (CSI) measurements;

transmit Radio Resource Control (RRC) signaling including a BWP identifier (ID) indicating the dormant BWP to the radio terminal; and transmit to the radio terminal a notification of transition to a dormancy mode in the SCell, wherein the RRC signaling includes information related to a first active BWP to be used upon activation of the SCell, wherein the information is set to the dormant BWP, wherein the RRC signaling includes information related to a periodicity of a report for the CSI measurements, and wherein the report for the CSI measurements is performed using the periodicity.

17. The RAN node according to claim 16, wherein the at least one processor is configured to receive the report for the CSI measurements from the radio terminal via the PCell or another activated serving cell.

18. The RAN node according to claim 16, wherein a BWP which is used before receiving the notification is activated in a case where activation of the SCell occurs.

19. The RAN node according to claim 16, wherein transmitting an SRS or transmitting a Random Access Channel (RACH) is stopped in the dormant BWP indicated by the BWP ID.

* * * * *